United States Patent
Choi et al.

(10) Patent No.: US 8,021,087 B2
(45) Date of Patent: Sep. 20, 2011

(54) TOOL HOLDER ASSEMBLY FOR MULTIFUNCTION MACHINE AND ADAPTER FOR THE SAME

(75) Inventors: Chang Hee Choi, Taegu (KR); Hong Sick Park, Taegu (KR); Dae Wi Bae, Taegu (KR)

(73) Assignee: Taegutec Ltd., Taegu (KR)

( * ) Notice: Subject to any disclaimer, the term of this patent is extended or adjusted under 35 U.S.C. 154(b) by 1357 days.

(21) Appl. No.: 10/554,687

(22) PCT Filed: Mar. 11, 2004

(86) PCT No.: PCT/KR2004/000497
§ 371 (c)(1),
(2), (4) Date: Nov. 2, 2006

(87) PCT Pub. No.: WO2004/096474
PCT Pub. Date: Nov. 11, 2004

(65) Prior Publication Data
US 2007/0059110 A1  Mar. 15, 2007

(30) Foreign Application Priority Data
Apr. 28, 2003 (KR) .................. 10-2003-0026764

(51) Int. Cl.
*B23B 51/00* (2006.01)
(52) U.S. Cl. .......... 408/59; 407/113; 408/199; 408/713
(58) Field of Classification Search .................. 408/199, 408/227, 229, 230, 233, 713, 57, 59; 407/113–117, 407/11; *B23B 51/00, 51/02, 51/08*
See application file for complete search history.

(56) References Cited

U.S. PATENT DOCUMENTS

| | | | |
|---|---|---|---|
| 3,779,664 A | * 12/1973 | Caley et al. | 408/225 |
| 3,794,437 A | 2/1974 | Mazoguchi | |
| 4,131,383 A | * 12/1978 | Powers | 407/114 |
| 4,293,251 A | * 10/1981 | Anderson | 408/59 |
| 4,475,853 A | * 10/1984 | Morgan | 409/137 |
| 4,573,836 A | * 3/1986 | Andersson | 408/59 |
| 4,606,680 A | * 8/1986 | Striegl | 408/156 |
| 5,957,633 A | * 9/1999 | Hall | 408/187 |
| 6,030,155 A | 2/2000 | Scheer et al. | |

FOREIGN PATENT DOCUMENTS

| | | | |
|---|---|---|---|
| DE | 3509753 A | * | 10/1985 |
| DE | 19707549 A1 | | 9/1997 |
| EP | 537476 A1 | * | 4/1993 |
| EP | 0 585 800 A1 | | 3/1994 |
| GB | 1600264 | | 10/1981 |
| JP | 63039706 A | * | 2/1988 |

* cited by examiner

*Primary Examiner* — Daniel Howell
(74) *Attorney, Agent, or Firm* — Maschoff Gilmore & Israelsen

(57) ABSTRACT

Tool holder assembly (TH) for multifunctional machining, such as drilling, boring, facing, and turning, eliminate interference between facing and turning, and secure an adequate chip groove space (10) for discharging chips therethrough without deterioration of a rigidity of the tool holder (TH), thereby securing a good quality of machining, and an exclusive adapter (TA) suitable to the foregoing tool holder (TH) assembly for multifunctional machining.

16 Claims, 6 Drawing Sheets

TOOL HOLDER ASSEMBLY FOR MULTIFUNCTION MACHINE AND ADAPTER FOR THE SAME

TECHNICAL FIELD

The present invention relates to a tool holder assembly for multifunctional machining, such as drilling, boring, facing, and turning, and an exclusive adapter for the same.

BACKGROUND ART

In general, a drilling tool holder with a cutting insert, working within a closed hole, has chip discharge as an important factor, and requires having a structure which discharges chips well and minimizes vibration.

An insert type drilling tool holder has unbalance of cutting inserts since in general two cutting inserts of outer and center cutting inserts are disposed asymmetrically in a tool holder pocket. Moreover, a small sized insert type tool holder for drilling a small hole has difficulty in disposing the two cutting inserts in the pocket of the tool holder, and has a poor rigidity.

Furthermore, in a case boring, facing, and turning are required in a lathe additionally after the drilling, though a few tool holders are required additionally, a high working productivity can not be secured owing to additional inventory, turret, and holder setting time period, and an increased cycle time period, and particularly, fabrication of a product of a good precision, and maintenance of good quality become difficult.

DISCLOSURE OF THE INVENTION

Accordingly, the present invention is directed to a tool holder assembly for multifunctional machining, and an adapter for the same that substantially obviates one or more of the problems due to limitations and disadvantages of the related art.

An object of the present invention is to provide a tool holder assembly for multifunctional machining, such as drilling, boring, facing, and turning, eliminate interference between facing and turning, and secure an adequate chip groove space for discharging chips therethrough without deterioration of a rigidity of the tool holder, thereby securing a good quality of machining.

Another object of the present invention is to provide an exclusive adapter suitable to the foregoing tool holder assembly for multifunctional machining.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the tool holder assembly for multifunctional machining, includes a cylindrical body with a rotation axis, a head part having a pocket for receiving one cutting insert, a chip groove started from the head part and extended to a rear side of the tool holder body for serving as a moving passage of chips, a cooling water tube started from an end part of a shank part, extended throughout entire tool holder in a form of a straight line, and sloped at an end part of the head part to face an outer nose of the cutting insert, and a cutting insert received in the pocket.

The cutting insert has a hexahedral form, and includes a screw hole in a center part thereof, chip formers around the screw hole, each having a slope angle, side surfaces each having a positive relief angle connected between a bottom surface and an upper surface of a cutting insert body, cutting edges at intersections of the upper surfaces and the side surfaces, each having three or more than three straight lines and a curved line. There is a rounded nose at each of four corner parts where the side surfaces with the cutting edges are connected, including an outer nose which fixes a size of drilled hole when the cutting insert is mounted on a tool holder, and an inner nose disposed such that a cutting edge is disposed beyond a center line of the tool holder, wherein the outer nose is formed to have an acute angle smaller than the inner nose having an obtuse angle, and the cutting edges, the chip formers and the side surfaces are formed to be symmetry with respect to a line dividing the nose into two equal parts.

In another aspect of the present invention, there is provided an adapter for a tool holder assembly including an adapter body including a square shank part, a sloped surface opposite to the shank part formed to mount a wedge, a dove tail groove for guiding up/down movement of the tool mount block, and a narrow groove formed from one corner of the dove tail groove toward a shank part direction of the adapter body, the wedge mounted to be movable along the sloped surface of the adapter body, a wedge screw engaged with the shank part of the adapter body, for moving the wedge along the sloped surface when the wedge screw is rotated, and locking means for making a front side part and a rear side part of the narrow groove of the adapter body to come into close contact for locking a position of the tool holder mount block moved in up/down direction along the dove tail groove in the adapter body by rotation of the wedge screw.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Before starting description of the embodiments of the present invention with reference to the attached drawings, characteristics required for, and an outline of a structure of the tool holder assembly and the adapter of the present invention will be described.

The tool holder assembly of the present invention includes a cylindrical body with a rotating axis for drilling and boring in a lathe, and one cutting insert in a pocket thereof so as to be provided in a smallest possible space, wherein the cutting insert requires to have an edge specially designed for drilling, and positive and helical edges with respect both to an axis direction of the tool holder and a direction perpendicular to the axis direction, for eliminating interference in facing and turning to have a good quality machining, and a tool holder suitable for the cutting insert is required.

Particularly, for drilling when chip discharge is important, a helical chip groove is required, which is twisted with respect to a center line for securing an adequate chip groove space without deterioration of a rigidity of the tool holder.

Moreover, though it is required that a height of a cutting edge of an end face cutting nose at which an initial machining is started in turning is the same with a center height of an work piece for prevention of vibration and breakage of the cutting insert, it is difficult that the height of the cutting edge of the end face cutting nose is the same with the center height of an work piece owing to poor precision caused by backlash occurred from a long time use of the equipment, and a manual adjustment of the height becomes impossible. Consequently, for solving this problem, it is required to provide an exclusive use jig which can adjust the height of a cutting edge.

Reference will now be made in detail to the preferred embodiments of the present invention, examples of which are illustrated in the accompanying drawings FIGS. 1~9.

Figure 1:
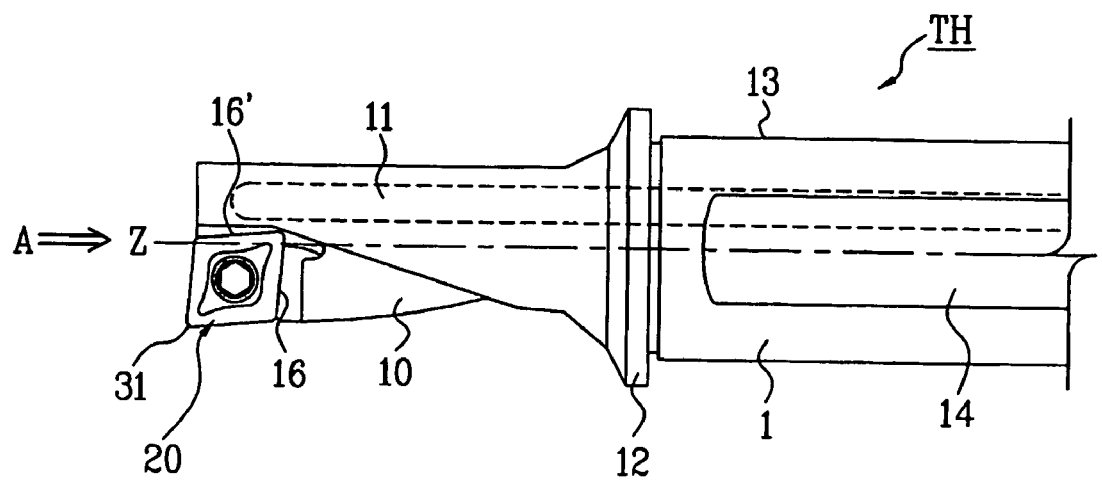
FIG. 1 illustrates a front view of a tool holder in accordance with a preferred embodiment of the present invention.
Figure 2:
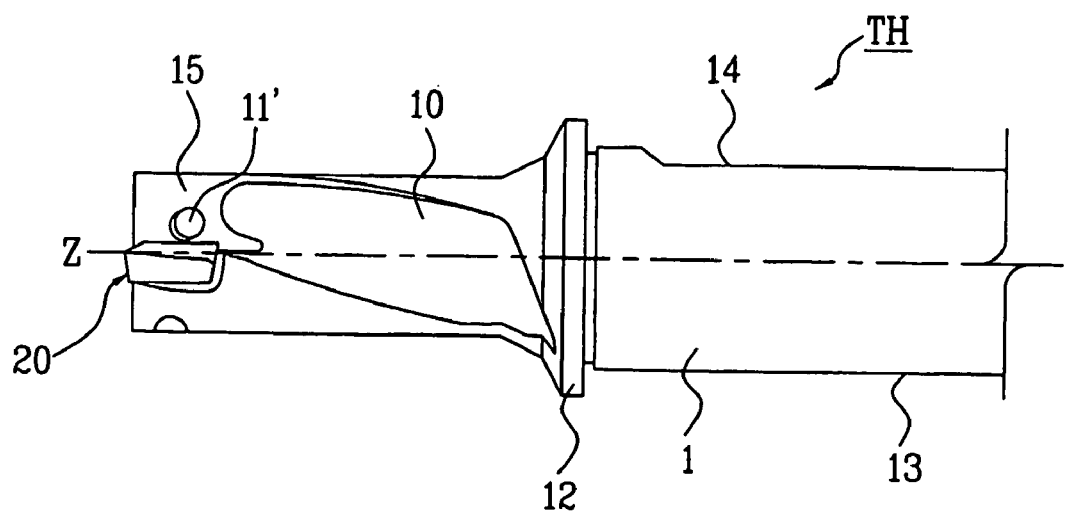
FIG. 2 illustrates a side view of a tool holder in accordance with a preferred embodiment of the present invention.
Figure 3:
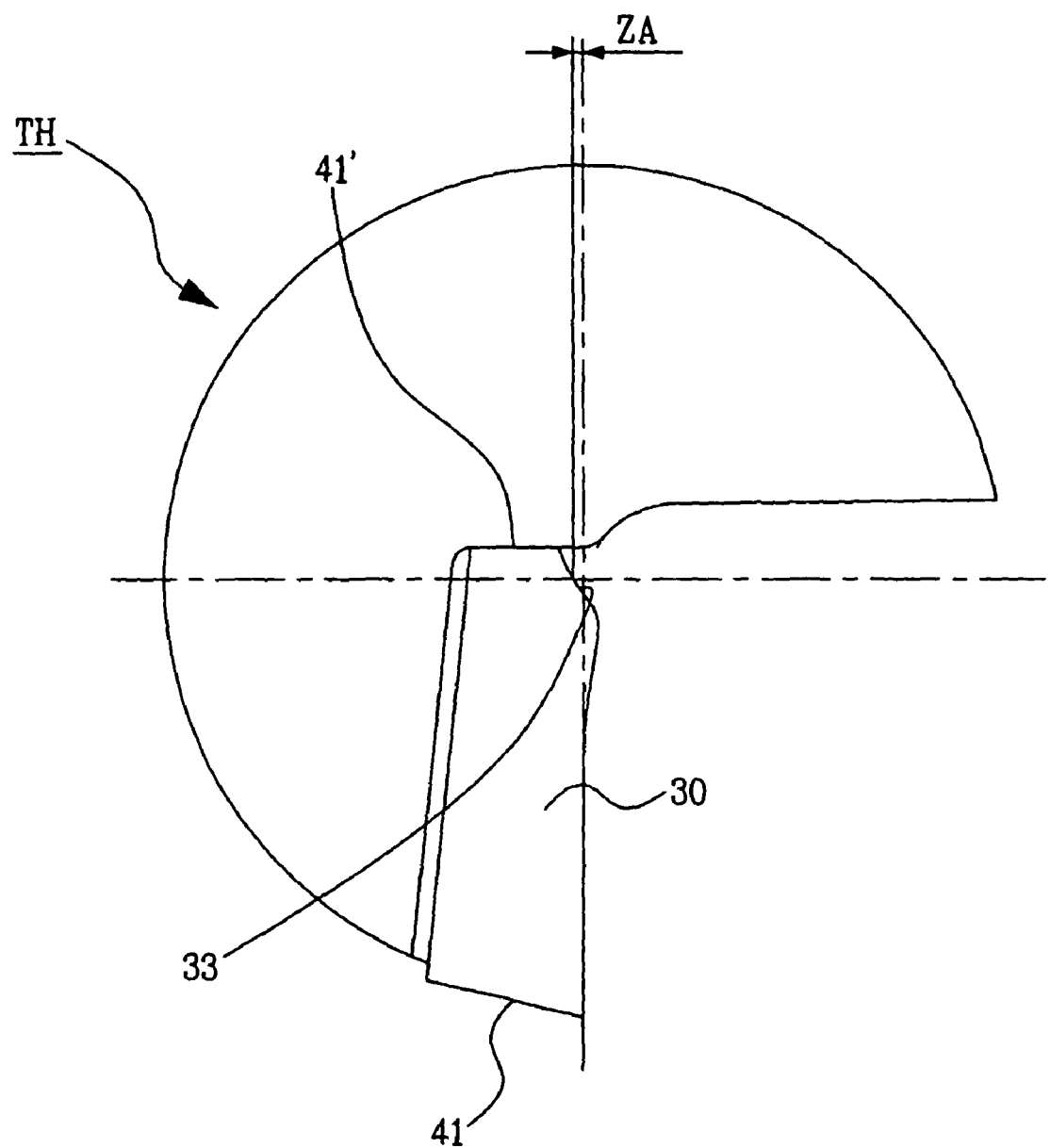
FIG. 3 illustrates the tool holder in FIG. 1 seen from an 'A' direction.

FIG. 1 illustrates a front view of a tool holder in accordance with a preferred embodiment of the present invention, FIG. 2 illustrates a side view of a tool holder in accordance with a preferred embodiment of the present invention, and FIG. 3 illustrates the tool holder in FIG. 1 seen from an 'A' direction.

Figure 4:
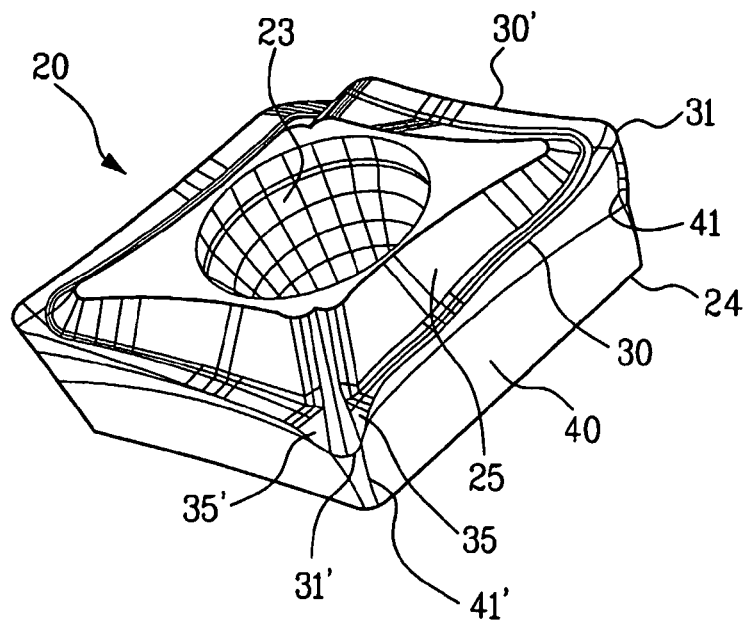
FIG. 4 illustrates a perspective view of a cutting insert in accordance with a preferred embodiment of the present invention.
Figure 5:
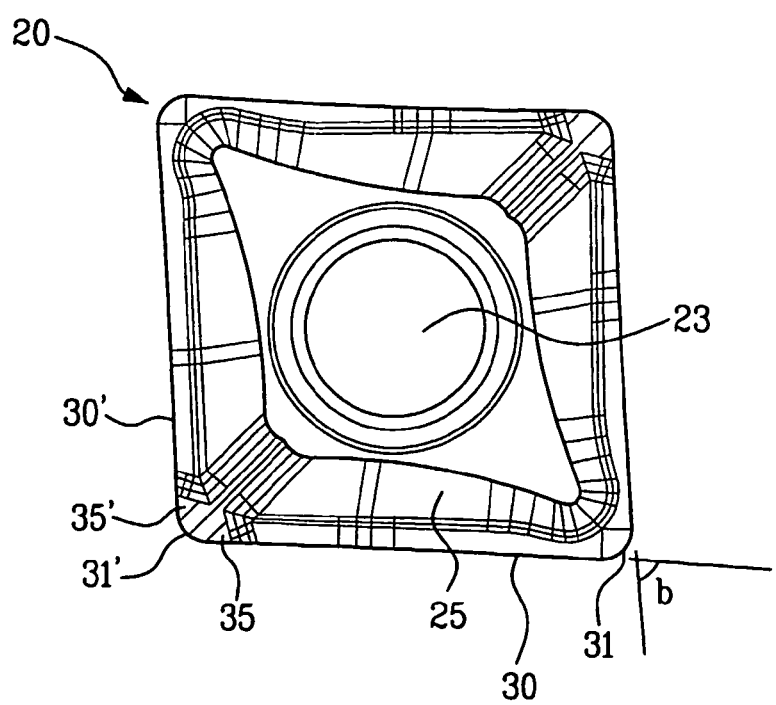
FIG. 5 illustrates a plan view of a cutting insert in accordance with a preferred embodiment of the present invention.
Figure 6:
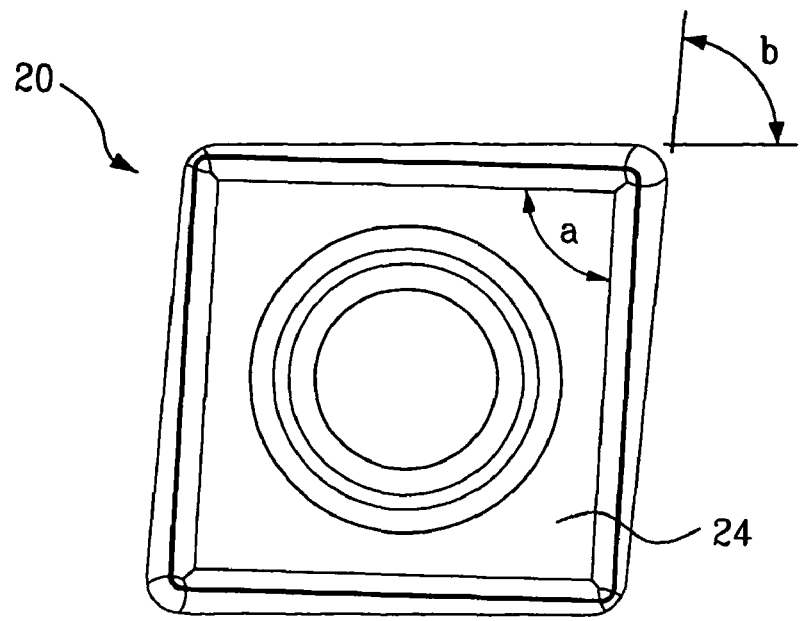
FIG. 6 illustrates a bottom view of a cutting insert in accordance with a preferred embodiment of the present invention.

FIG. 4 illustrates a perspective view of a cutting insert in accordance with a preferred embodiment of the present invention, FIG. 5 illustrates a plan view of a cutting insert in accordance with a preferred embodiment of the present invention, and FIG. 6 illustrates a bottom view of a cutting insert in accordance with a preferred embodiment of the present invention.

Figure 7:
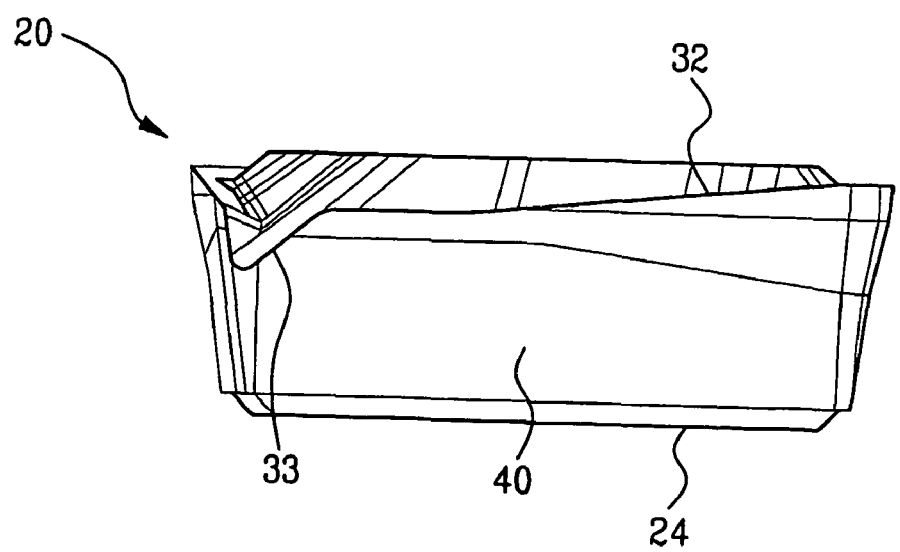
FIG. 7 illustrates a side view of a cutting insert in accordance with a preferred embodiment of the present invention.
Figure 8:
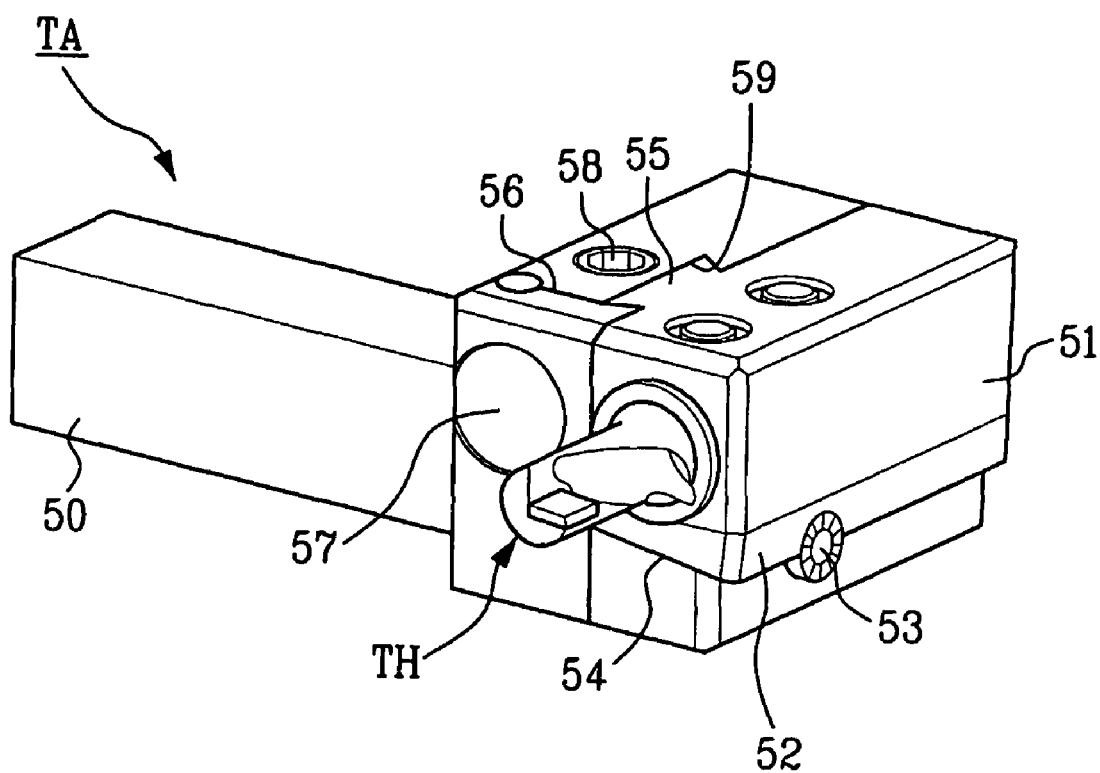
FIG. 8 illustrates a perspective view of a tool holder assembly in accordance with a preferred embodiment of the present invention assembled with an adapter.
Figure 9:
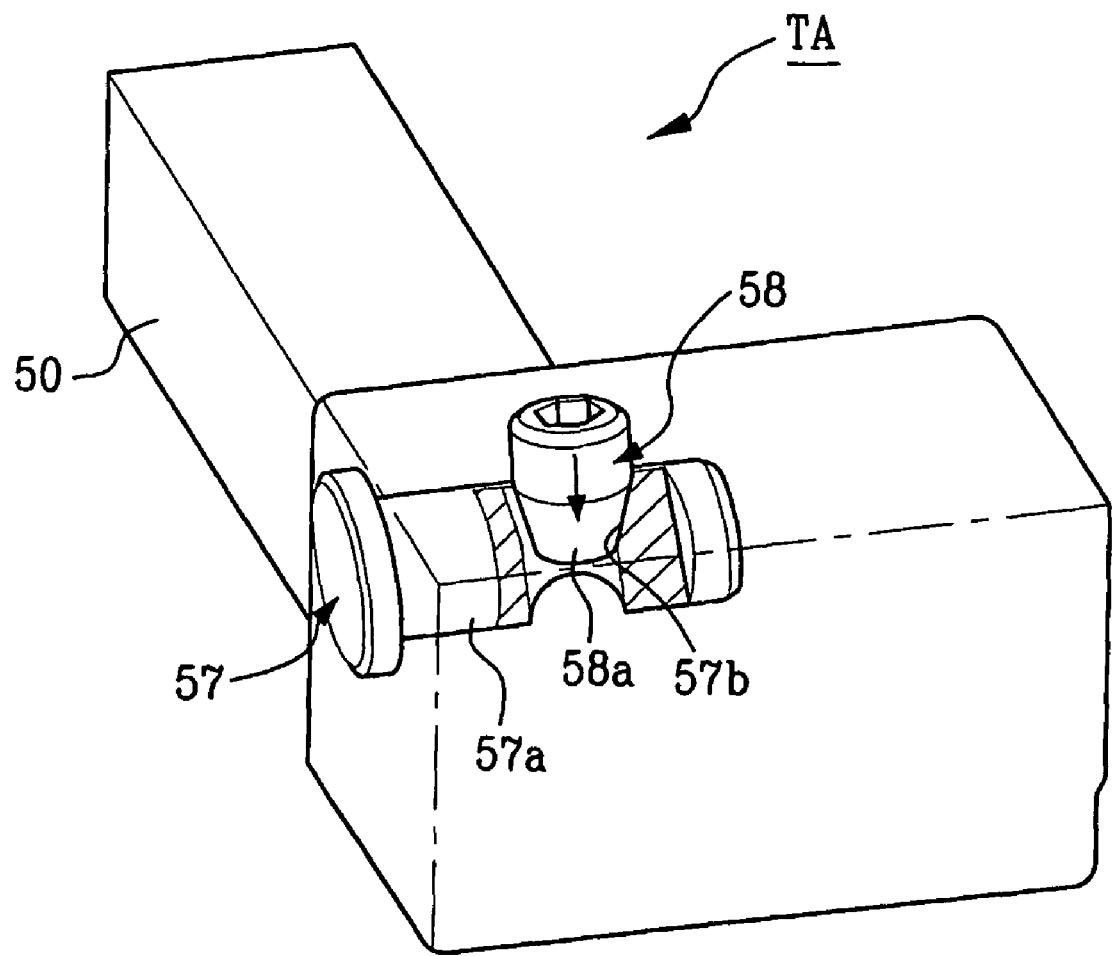
FIG. 9 illustrates a perspective view of key parts of a tool holder mount block locking device on an adapter of the present invention.

FIG. 7 illustrates a side view of a cutting insert in accordance with a preferred embodiment of the present invention, FIG. 8 illustrates a perspective view of a tool holder assembly in accordance with a preferred embodiment of the present invention assembled with an adapter, and FIG. 9 illustrates a perspective view of key parts of a tool holder mount block locking device on an adapter of the present invention.

Referring to FIGS. 1 and 2, the tool holder assembly includes a cylindrical tool holder body 1 having a rotation axis, a head part 15 in front of the tool holder body 1 having a pocket 16 or 16' for receiving a cutting insert 20, a chip groove 10 for serving as a moving passage of chips produced by the cutting insert 20, a cooling water tube 11 for supplying cooling water, a flange 12 connecting the chip groove 10 and the shank part 13 and fixing a position of insertion of the tool holder TH in a length direction, the shank part 13 for fixing the tool holder to a machining apparatus, a tool holder TH in the shank part 13 having flat surfaces 14 for prevention of rotation of the tool holder TH when assembled with an adapter of a tool holder assembly and serving as reference planes for placing the cutting insert 20, and a cutting insert 20 received in a pocket 16 and 16' formed in the head part 15 of the tool holder TH.

The object of the present invention is to provide a tool holder TH of a multifunctional tool which can make drilling as base, and facing and turning, and has a good machining performance.

Accordingly, the tool holder body 1 is required to be cylindrical with the rotation axis for the basic drilling.

In the meantime, as the facing and turning require only one cutting insert 20, only one cutting insert 20 is mounted in the pocket 16, 16' of the tool holder TH of the present invention.

Though the tool holder TH moves in the length direction of a centerline in drilling, the tool holder TH moves in a direction perpendicular to the length direction in facing. Therefore, for the two direction movement of the cutting, it is required to design the cutting edges 30 and 30' of the cutting insert 20 to have no interference to each other in respective directions.

One cutting insert 20 is mounted in the pocket 16 or 16' in the head part of the tool holder TH, wherein an outer nose 31 fixes a size of a drilling hole, and the cutting edge is positioned such that an inner nose 31' is positioned beyond a center line 'Z' of the tool holder body 1 because an entire cutting edge from the outer nose 31 to the inner nose 31' is brought into contact with the work piece in drilling.

In the meantime, the cutting insert 20 has a screw hole 53 in a center part thereof, a flat bottom surface 24, and a chip former 25 on an upper surface for breaking chips appropriately.

The bottom surface and the upper surface of the cutting insert 20 are connected with a side surface having a positive relief angle, to form the cutting edges 30 and 30' at intersections of the upper surfaces and the side surfaces.

The cutting insert 20 has round noses 31 and 31' at corners, of the outer nose 31 at an outer side of the tool holder TH and the inner nose 31' close to the center line.

In the meantime, the cutting edges 30 and 30' and the chip formers 25 are formed in symmetry with respect to lines dividing the noses 31 and 31', equally.

Moreover, the cutting insert 20 has a helical edge that has a height which is the highest at the outer nose 31 where the cutting initiates and becomes the lower as it goes the farther toward the inner nose 31', for minimizing a cutting resistance in a radial and axial direction of the tool holder TH.

That is, referring to FIGS. 3 and 7, the helical cutting edge has three or more than three straight parts and a curved part, wherein an outer nose part cutting edge 32 starting from the outer nose 31 is a straight cutting edge with 3~10 degrees of positive edge, and an inner nose part cutting edge 33 at the inner nose 31' is positioned 'ZA' lower than the center line of the tool holder body 1 so that a core is formed at a center of a work piece in drilling.

The inner nose part cutting edge 33 is a positive edge with 20~60 degrees of angle from the bottom surface, or a large curved sloped edge with a tangential angle similar thereto.

In the meantime, since the tool holder body 1 has a zero cutting speed at the center line thereof with no cutting power, the cutting edge is liable to breakage. Therefore, for preventing breakage of the cutting edge, a maximum edge strength is required.

To do this, referring to FIG. 4, a cutting edge on the centerline 'Z' of the tool holder body 1 in the vicinity of the inner nose 31' of the cutting insert 20 forms sloped surfaces 35 and 35' extended toward a center direction of the cutting insert 20, at a negative angle greater than 0 degree with respect to the bottom surface 24 in symmetry to a straight line that divides the nose into two part, equally.

It is also required that the cutting insert 20 is designed to have no interference to each other in a direction moving away from the outer nose 31 for carrying out machining in two directions of the centerline direction of the tool holder TH and a direction perpendicular thereto.

Referring to FIG. 5, because the greater an end cutting edge angle formed between the cutting edge and the work piece, the weaker a cutting edge strength, and the smaller the end cutting edge angle, the better a surface roughness, but the more susceptible to vibration, it is appropriate that the outer nose 31 has an acute angle smaller than the inner nose 31' in a 75~85 degree range (b; the same with an upper corner angle).

In the meantime, it is preferable that a bottom of a drilling hole is flat as far as possible. To do this, it is designed in the present invention that a thrust to the cutting edge 30 or 30', a force in a length direction of the tool holder TH, exerts only in a center line direction of the tool holder TH, for preventing bending of the tool holder TH.

On the other hand, the cutting edge 30 or 30' forms a dish angle to a surface of the work piece in facing. If the dish angle is great excessively, though a cutting ability is good, a strength of the cutting edge becomes poor, and opposite to this, if the dish angle is small excessively, vibration is liable to occur and a machined work piece can be machined, again.

Accordingly, taking above two factors into account, it is appropriate that the dish angle is formed in a range of 1~5 degrees.

In turning, only a part of the cutting edge is used, including the outer nose 31 used in drilling. The end cutting edge angle formed in the turning is provided for preventing interference between a cutting surface and a tool, wherein if the end cutting edge angle is great excessively, a surface roughness of the work piece, and cutting edge strength become poor, and opposite to this, if the end cutting edge angle is small excessively, vibration is liable to occur.

In the meantime, though a square tool holder TH has the highest strength in turning, and a cylindrical tool holder has a lower strength, which may cause an intensive vibration.

Particularly, since the tool holder is used in a low cutting condition of a feed in a range of 0.03~0.3 mm/rev, an amount of movement of a tool when the work piece makes one turn, even if the end cutting edge angle becomes greater, the surface roughness of the machining does not become poor, substantially.

Therefore, taking above into account, it is preferable that the end cutting edge angle is set to be between minimum 4° 10' to maximum 10° in turning.

Referring to FIG. 6, the cutting insert 20 has positive cutting edges symmetry with respect to a diagonal line which divides the nose 31 or 31' into two equal parts, wherein, since a strength of the whole cutting insert 20 becomes weaker if the acute corner angle is too small, it is required that the cutting insert 20 has a less acute corner angle (a) at the bottom surface and a more acute corner angle (b) at the upper surface for better cutting ability, for maintaining a good cutting ability at the cutting edge part while the strength is not weakened.

Therefore, for improving the strength of the whole cutting insert 20, a side surface 40 extended from the bottom surface 24 to the cutting edge is required to have an inner nose relief angle 41' formed of one relief angle at an inner nose 31' part, and an outer nose relief angle 41 having two or more than two relief angles for providing more acute corner angle at the outer nose 31 part.

In this instance, a surface between the inner nose and the outer nose is a relief surface having an interposing angle varying in succession between the two.

The acute corner angle (a) at the bottom surface of the outer nose corner and the acute corner angle (b) at the cutting edge 30 or 30' at the upper surface differ, wherein the corner angle (b) at the upper nose has an angle with more than three degree difference from the corner angle (a) at the bottom surface connected with the side surface 40.

In the meantime, in drilling, the tool holder TH is required to have an adequate rigidity while chips can be discharged well. Though it is required to have a large chip groove area for good chip discharge, which however, causes the rigidity of the tool holder TH poor.

For this, referring to FIG. 1, the tool holder TH of the present invention is designed such that the chips produced from one cutting insert 20 mounted in the pocket 16 or 16' are discharged to an outside of the body through helical chip grooves 10 in the cylindrical tool holder body 1.

In this instance, helical chip grooves 10 each with a helical angle is more favorable than a straight chip grooves 10, because the helical chip groove 10 can secure a larger chip groove area, to enable a higher chip discharge rate, and provide a better rigidity.

That is, in drilling, a twisting moment on the cutting edge is concentrated on an end of the chip groove 10 just before the flange 12 which is the weakest part in the tool holder body 1. For avoiding positioning of the chip groove 10 at a part twisting starts, not a straight chip groove parallel with the cutting edge, but a helical chip groove turned to a certain angle is required.

Accordingly, the chip groove 10 is formed such that the chip groove 10 has the same tangential angles in a range of 5~25 degrees at all positions of the chip groove 10 with respect to the centerline of the tool holder TH.

However, if the cutting condition is low, as the twisting moment has a small influence to the rigidity of the tool holder TH, the chip groove may have a straight angle with respect to the centerline of the tool holder TH without twisting.

Moreover, for better chip discharge and cooling of the cutting edge, the cooling water tube 11, a passage for supplying cutting oil, is started from an end of the shank part 13 and provided throughout the tool holder body 1, and a cooling water discharge hole 11' is formed at an end of the head part 15 with a slope such that the cooling water discharge hole 11' faces the cutting insert end face cutting corner part.

Along with this, there is a wing form of flange 12 provided at a position the chip groove 10 ends connected to the shank part 13. The flange 12 is designed to have a large sectional area, for more stable and firm fixing of the tool holder TH to an apparatus by holding the tool holder with two surfaces together with the shank part 13.

The shank part 13 extending from the flange 12 to an end of the tool holder TH, where the flat surfaces 14 are formed. The flat surfaces 14 are fastened with screw to the tool holder TH firmly for prevention of turning.

The flat surfaces 14 are positioning reference of the cutting insert 20 when the cutting insert 20 is mounted in the pocket 16 or 16'. In the fixed type tool holder TH, it is required that the cutting edge is at a position the same with a center of the work piece for eliminating problems caused in machining. The flat surfaces 14 provide a reference therefor.

Particularly, since the cutting speed is zero at a center of the work piece in drilling, the position of the cutting edge is very important.

Though it is required that a height of a cutting edge where cutting initiates in turning is the same with a center height of the work piece for prevention of vibration and damage to the cutting insert, making the height of the cutting edge to be the same with the center height of the work piece is not possible only with the fixation of the tool holder TH to a machining apparatus actually, and manual adjustment of the height in the state is also almost impossible.

For solving the problem, a separate adapter TA is required for adjusting the center height of the cutting edge applicable to the tool holder TH of the present invention.

That is, structural characteristic of the adapter TA for exclusive use of the tool holder of the present invention lies on fast and accurate adjustment of a cutting edge height of the cutting insert 20 by simple rotation of a wedge screw.

Referring to FIGS. 8 and 9, the present invention provides an exclusive adapter TA for accurate positioning a scanning nose 31 of the cutting insert 20 to a center height of a work piece when the tool holder TH is mounted on a machining apparatus.

The adapter TA for exclusive use of the tool holder of the present invention includes an adapter body 50 having a square shank for mounting to a machining apparatus, a tool holder mount block 51 for mounting the tool holder TH, a wedge 52 on an underside of the tool holder mount block 51 for moving the block 51 in an up/down direction, a wedge screw 53 for moving the wedge 52 along a sloped surface of the adapter body 50, and a locking pin 57 and a locking screw 58 and the like for fastening the tool holder mount block 51 to the adapter body 50, firmly.

The locking pin 57 is fixed to a front surface of a front part of a narrow groove 56 in the adapter body, and a shaft part 57a has a conical guide hole 57b formed the smaller as it goes the farther toward a shaft center direction.

The locking screw 58 is provided in an upper surface of a rear part of the narrow groove 56 formed in the adapter body 50 vertical to the locking pin 57, and has a conical part 58a positioned in the conical guide hole 57b.

The adapter TA for exclusive use of the tool holder has the narrow groove 56 cut toward the shank part 13 started from an end of the dove tail part 55 of the adapter body 50 for firm fixing of the block 51 at a position where an up/down direction position adjustment of the tool holder mount block 51 is finished.

Accordingly, the tool holder mount block 51 moves in the up/down direction along the dove tail groove 59 by means of the dove tail part 55, and is fixed by interaction of the locking pin 57 and the locking screw 58 after the tool holder mount block 51 is moved to a desired position. The acute holding surfaces of the dove tail part 55 permits a firm and stable positioning of the tool holder mount block 51 at the desired position.

In the meantime, the wedge screw 53 in the wedge 52 is engaged with the adapter body 50, so that the wedge 52 is moved in a left/right direction as well as an up/down direction along a sloped surface 54 of the adapter body 50 as the wedge screw 53 is rotated, for fine adjustment of the cutting edge height of the cutting insert 20 to a rotation center of the work piece.

In the cutting edge height adjustment of the cutting insert by means of the adapter TA for exclusive use of the tool holder of the present invention, after the finish of the up/down direction position adjustment of the tool holder mount block 51, by using a fastening force of the locking screw 58 to the locking pin 57, a part in front of the narrow groove 56 of the adapter body 50 is elastically deformed to move the narrow groove 56 in a direction the narrow groove 56 becomes smaller, so that inside surfaces of the dove tail groove 59 of the adapter body 50 is made a close contact with outside surfaces of the dove tail part 55 of the block, to fix the tool holder mount block 51 at the position, thereby finishing the cutting edge height adjustment of the cutting insert.

As described, the present invention provides a tool holder assembly for multifunctional machining, such as drilling, boring, facing, and turning, eliminate interference between facing and turning, and secure an adequate chip groove space for discharging chips therethrough without deterioration of a rigidity of the tool holder, thereby securing a good quality of machining.

Along with this, the present invention provides an adapter for exclusive use of the tool holder assembly, which can position a cutting edge of a cutting insert to a center of a work piece by a simple operation.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A tool holder assembly for multifunctional machining, comprising:
   a cylindrical body with a rotation axis;
   a head part having a pocket for receiving one cutting insert;
   a chip groove started from the head part and extended to a rear side of the tool holder body for serving as a moving passage of chips;
   a cooling water tube started from an end part of a shank part, extended throughout entire tool holder in a form of a straight line, and sloped at an end part of the head part to face an outer nose of the cutting insert; and
   a cutting insert received in the pocket,
   wherein the cutting insert has a hexahedral form, and includes:
      a screw hole in a center part thereof,
      chip formers around the screw hole, each having a slope angle,
      side surfaces each having a positive relief angle connected between a bottom surface and an upper surface of a cutting insert body,
      cutting edges at intersections of the upper surfaces and the side surfaces, each having three straight lines and a curved line,
   wherein there is a rounded nose at each of four corner parts where the side surfaces with the cutting edges are connected, including an outer nose which fixes a size of drilled hole when the cutting insert is mounted on a tool holder, and an inner nose disposed such that a cutting edge is disposed beyond a center line of the tool holder,
   wherein the outer nose is formed to have an acute angle smaller than the inner nose having an obtuse angle, and the cutting edges, the chip formers and the side surfaces are formed to be symmetrical with respect to a line dividing the nose into two equal parts.

2. The tool holder assembly as claimed in claim 1, further comprising a flange between a part the chip groove ends and the shank part for connecting the two parts and fixing a position of shank part insertion in fixing the tool holder, and the shank part has flat surfaces for prevention of rotation of the tool holder and serving as a reference in placing the cutting insert.

3. The tool holder assembly as claimed in claim 1, wherein the chip groove in the head part of the tool holder is twisted in a range of 5° to 25° with respect to the center line of the tool holder.

4. The tool holder assembly as claimed in claim 1, wherein the outer nose has an angle ranging from 75 to 85 degrees.

5. The tool holder assembly as claimed in claim 1, wherein the cutting edge is helical form that has a height which is the highest at the outer nose and becomes lower as it goes the farther toward the inner nose.

6. The tool holder assembly as claimed in claim 1, wherein the cutting edge adjacent to the inner nose is positioned below a center line of the tool holder.

7. The tool holder assembly as claimed in claim 6, wherein the cutting edge adjacent to the inner nose is a positive edge with 20 to 60 degrees of angle from the bottom surface, or a large curved sloped edge with a tangential angle similar thereto.

8. The tool holder assembly as claimed in claim 1, wherein the cutting edge forms a positive dish angle to a line perpendicular to the center line of the tool holder so that an outer nose part is brought into contact with a work piece at first in facing.

9. The tool holder assembly as claimed in claim 1, wherein the positive dish angle of the cutting edge is in a range of from 1° to 5°.

10. The tool holder assembly as claimed in claim 1, wherein the cutting insert is formed such that an end cutting edge angle between the cutting edge and a surface of the work piece in a direction of the center line of the tool holder in turning is positive.

11. The tool holder assembly as claimed in claim 10, wherein the end cutting edge angle is in a range of 4° 10' to 10°.

12. The tool holder assembly as claimed in claim 1, wherein a corner of the outer nose of the cutting insert has a bottom corner angle 3° or more than 3° greater than an upper corner angle.

13. The tool holder assembly as claimed in claim 1, wherein the side surface of the cutting insert having a positive relief angle includes, one surface with one angle at the inner nose, two or more than two connected surfaces with two or more than two angles at the outer nose, and a continuous surface having an angle changing continuously in an interpolation of two relief angles between the inner nose and the outer nose.

14. The tool holder assembly as claimed in claim 3, wherein the cutting edge on the center line of the tool holder adjacent to the inner nose forms a sloped surface extended toward a center of the cutting insert at a negative slope angle greater than 0° to the bottom surface in symmetry with respect to a line that divides the nose into two parts, equally.

15. The tool holder assembly as claimed in claim 1, wherein the chip groove in the head part of the tool holder has the same tangential angle to the center line of the tool holder at all positions of the chip groove.

16. The tool holder assembly as claimed in claim 1, wherein the tangential angle of the chip groove to the center line of the tool holder is in a range of 5° to 25°.

* * * * *